W. M. THOMPSON.

Improvement in Car-Coupling.

No. 132,501. Patented Oct. 22, 1872.

Witnesses:
Henry N. Miller
C. L. Evert

Inventor.
Wm. M. Thompson,
per Alexander Mason
Attorneys.

UNITED STATES PATENT OFFICE.

WILLIAM M. THOMPSON, OF CARLISLE, PENNSYLVANIA.

IMPROVEMENT IN CAR-COUPLINGS.

Specification forming part of Letters Patent No. 132,501, dated October 22, 1872.

*To all whom it may concern:*

Be it known that I, WM. M. THOMPSON, of Carlisle, in the county of Cumberland and in the State of Pennsylvania, have invented certain new and useful Improvements in Car-Couplings; and do hereby declare that the following is a full, clear, and exact description thereof, reference being had to the accompanying drawing and to the letters of reference marked thereon making a part of this specification.

The nature of my invention consists in the construction and arrangement of a "car-coupling," as will be hereinafter more fully set forth.

In order to enable others skilled in the art to which my invention appertains to make and use the same, I will now proceed to describe its construction and operation, referring to the annexed drawing, in which—

Figure 1:
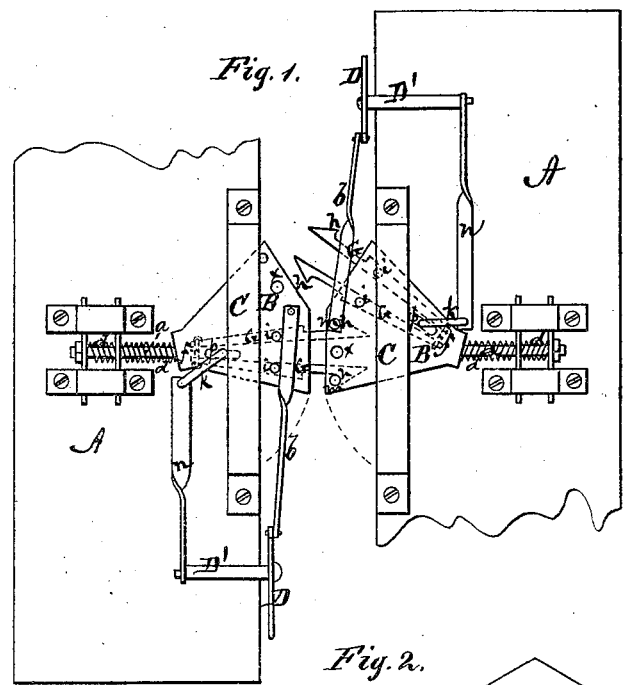
Figure 2:
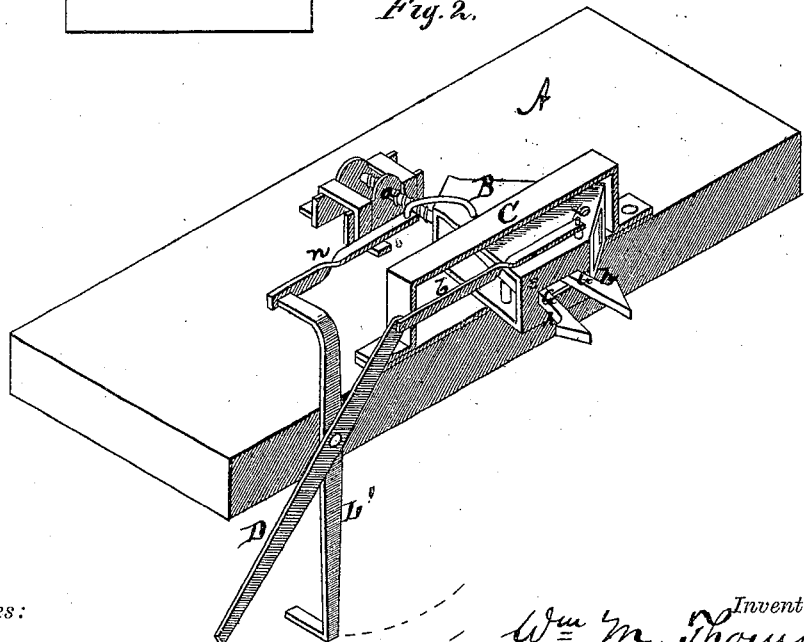

Figure 1 is a bottom view of the entire car-coupling; and Fig. 2 is an inverted perspective view of one bumper with its attachments.

A represents the platform of a railroad car, under which is the bumper B resting upon or supported by the stirrup C. The bumper B is of the irregular nearly segmental shape shown in the drawing, and its inner end so attached to a draw-rod, $a$, that the bumper may be moved a suitable distance from side to side. This movement of the bumper is effected by means of a lever, D, pivoted on the front end of the platform A, and the lower end of said lever connected by a rod or bar, $b$, to the bumper in the center, at the front end. The draw-rod $a$ is provided with suitable springs $d$, so that the bumper can give sufficiently both in coming together and drawing. The front side of the bumper B is inclined from the center toward each side, and one of these inclined portions has a plate, $e$, closing the same. This plate is slotted, as shown in Fig. 2, and through said slot project the front ends of two levers, G G, which are pivoted at $i\ i$ in the bumper, and their inner ends drawn together by a spring, $f$. On the outer end of each lever G, on the outside, is formed a hook, $h$, with beveled point, as shown. When two cars come together the wedge-shaped or beveled ends of the levers or rods G G will slip into the open part of the opposite bumper and, by means of the spring $f$, the hooks $h\ h$ will catch on rods or pins $m\ m$, thus coupling the cars. For uncoupling the lever D' is used, which lever is pivoted on the same bolt or stud that pivots the lever D, and its lower end is, by a rod, $n$, connected with a crank, $k$, formed upon the lower pivot of a plate, $p$, which is pivoted in the bumper between the inner ends of the levers G G. By the use of the lever D' the plate $p$ may be turned so as to force the inner ends of the lever G G apart, closing the outer ends, and thereby disengaging the same from the pins $m\ m$ and uncoupling the cars. $x\ x$ are pin-holes for coupling with the common link or chain. If one car has this coupling on and the other a different coupling, place the open side of the bumper B front by means of the lever D, and the common pin-and-link coupling can be used.

With this coupling there is less loss or waste of time than with the ordinary method. Many of the dangers of coupling by the ordinary method, resulting in accidents and loss of life, are remedied by this method. In no case is it necessary to leave the platform to couple or uncouple. It will couple with any height platforms from one to six inches, or it could be constructed for more if thought necessary. It may be made of either cast or wrought iron or parts of either.

Having thus fully described my invention, what I claim as new, and desire to secure by Letters Patent, is—

1. The combination of the lever D', rod $n$, crank $k$, and plate $p$, all constructed and arranged substantially as and for the purposes herein set forth.

2. The combination of the bumpers B B, levers G G with hooks $h\ h$, spring $f$, and pins $m\ m$, substantially as and for the purposes herein set forth.

3. The arrangement under the platform A of the bumper B, stirrup C, draw-bar $a$, lever D, and connecting-rod $b$, all substantially as and for the purposes herein set forth.

In testimony that I claim the foregoing I have hereunto set my hand this 18th day of July, 1872.

W. M. THOMPSON.

Witnesses:
GEO. P. MYERS,
D. B. SAXTON.